US006021313A

United States Patent [19]

Koga

[11] Patent Number: 6,021,313

[45] Date of Patent: Feb. 1, 2000

[54] RADIO SELECTIVE CALL RECEIVER WITH TIME LAPSED IMAGE DISPLAY

[75] Inventor: Kuniaki Koga, Shizuoka, Japan

[73] Assignee: NEC Corporation, Tokyo, Japan

[21] Appl. No.: 08/869,594

[22] Filed: Jun. 5, 1997

[30] Foreign Application Priority Data

Jun. 12, 1996 [JP] Japan .................................. 8-150853

[51] Int. Cl.[7] ........................................ H04Q 7/14

[52] U.S. Cl. .................. 455/38.4; 455/31.1; 340/825.44; 340/311.1; 340/825.47

[58] Field of Search ...................... 455/38.4; 340/825.44, 340/311.1, 825.47

[56] References Cited

U.S. PATENT DOCUMENTS

| | | | |
|---|---|---|---|
| 5,225,826 | 7/1993 | DeLuca et al. | 340/825.44 |
| 5,258,751 | 11/1993 | DeLuca et al. | 340/825.44 |
| 5,473,320 | 12/1995 | DeLuca et al. | 340/825.44 |
| 5,774,061 | 6/1998 | Kudoh | 340/825.44 |
| 5,805,981 | 9/1998 | Sugio et al. | 455/38.4 |

FOREIGN PATENT DOCUMENTS

| | | | |
|---|---|---|---|
| 62-189827 | 8/1987 | Japan . | |
| 62-208723 | 9/1987 | Japan . | |
| 3-89639 | 4/1991 | Japan . | |
| 3-171937 | 7/1991 | Japan . | |
| 3-277025 | 12/1991 | Japan . | |
| 5-91023 | 4/1993 | Japan . | |
| 5-167508 | 7/1993 | Japan . | |
| 7-336744 | 12/1995 | Japan . | |
| 8-33011 | 2/1996 | Japan . | |
| 8-70478 | 3/1996 | Japan . | |
| 2 255 847 | 11/1992 | United Kingdom . | |
| 2255847A | 11/1992 | United Kingdom | H04B 5/04 |

*Primary Examiner*—William G. Trost
*Assistant Examiner*—Sonny Trinh
*Attorney, Agent, or Firm*—Young & Thompson

[57] ABSTRACT

An illustration control section 41 contained in a control section 4 stores a lapsed time T after reception of the received message which is obtained from a timer 18 in a RAM 20. Further, a ROM 19 stores illustrations according with the respective lapsed times T for a plurality of periods. When a carrier pushes a display switch 16, the control section 4 displays a received message in a display section 11. Here, the illustration control section 41 reads out an illustration according with the lapsed time T after reception of the message to be displayed from a ROM 19, and displays the illustration together with the received message. If the illustration expresses feelings by a smiling face, a straight face, an angry face or the like, it is possible to readily call the carrier's attention to the lapsed time T.

7 Claims, 5 Drawing Sheets

Fig.3

| | RAM12 | RAM20 |
|---|---|---|
| ADDRESS | RECEIVED MESSAGE | LAPSED TIME T |
| A1 | CALL ME | 6HOUR< |
| A2 | COME TO MY OFFICE | 6H< |
| A3 | FAX ME | 1H~6H |
| A4 | SHINJUKU AT 8:00 | 1H> |
| A5 | — | — |
| A6 | — | — |

RADIO SELECTIVE CALL RECEIVER WITH TIME LAPSED IMAGE DISPLAY

BACKGROUND OF THE INVENTION

1. Field of the Invention

The present invention relates to a radio selective call receiver with a display being capable of displaying a message in the display section, and more particularly to a radio selective call receiver with a display which has a time stamp function for displaying information of a message receiving time.

2. Description of the Related Art

This type of prior art radio selective call receiver with a display has a time stamp function for additionally displaying a message receiving time as well as a received message in the display section when confirmatory displaying the received message. Such a radio selective call receiving with a display is disclosed in, for example, Japanese patent laid-open publication No. Hei 5-91023 or No. Hei 5-167508.

The time stamp in the above-described prior art radio selective call receiver with the display, however, displays a message receiving time. A carrier of this call receiver, therefore, can not be immediately aware of a lapsed time after the message receiving time.

Further, the time stamp function is usually coordinated with a timer function of the call receiver. Accordingly, if the carrier did not put the timepiece right, the time-stamped message receiving time would be absolutely different from the actual time.

SUMMARY OF THE INVENTION

In view of the above-described drawbacks, it is, therefore, an object of the present invention to provide an improved radio selective call receiver with a display.

It is another object of the present invention to provide a radio selective call receiver with a display by which a carrier of the receiver can easily recognize a lapsed time after reception of a message.

A radio selective call receiver having a display function according to the present invention for displaying a message in a display section is provided with an illustration display circuit for displaying a lapsed time after reception of a message in the form of an illustration which varies in accordance with the lapsed time, as well as the received message, when confirmatively displaying the received message in a display section.

It is preferable to use illustrations expressing feelings. For example, the illustration may take a form of a smiling face in a first period in which the lapsed time after reception is smallest, a straight face in a second period in which the lapsed time exceeds the first period and a predetermined time is yet to pass, or an angry face when the lapsed time exceeds the second period.

The illustration display circuit is preferably provided with a timer for counting a lapsed time after reception of a received message; a ROM for previously storing illustrations according with respective lapsed times in a plurality of periods by using illustration codes; and an illustration control section which reads out an illustration code according with a period of the lapsed time from the ROM and displays an illustration corresponding with the illustration code as well as a received message in a display section in response to a request for confirmatively displaying the received message.

BRIEF DESCRIPTION OF THE DRAWINGS

These and other object, features and advantages of this invention will become more fully apparent from the following detailed description taken with the accompanying drawings in which:

FIG. 3 is a view showing an example of a stored content in a RAM illustrated in FIG. 1;

In the drawings, the same reference numerals denote the same structural elements.

DESCRIPTION OF THE PREFERRED EMBODIMENTS

The present invention will now be described with reference to the accompanying drawings.

Figure 1:
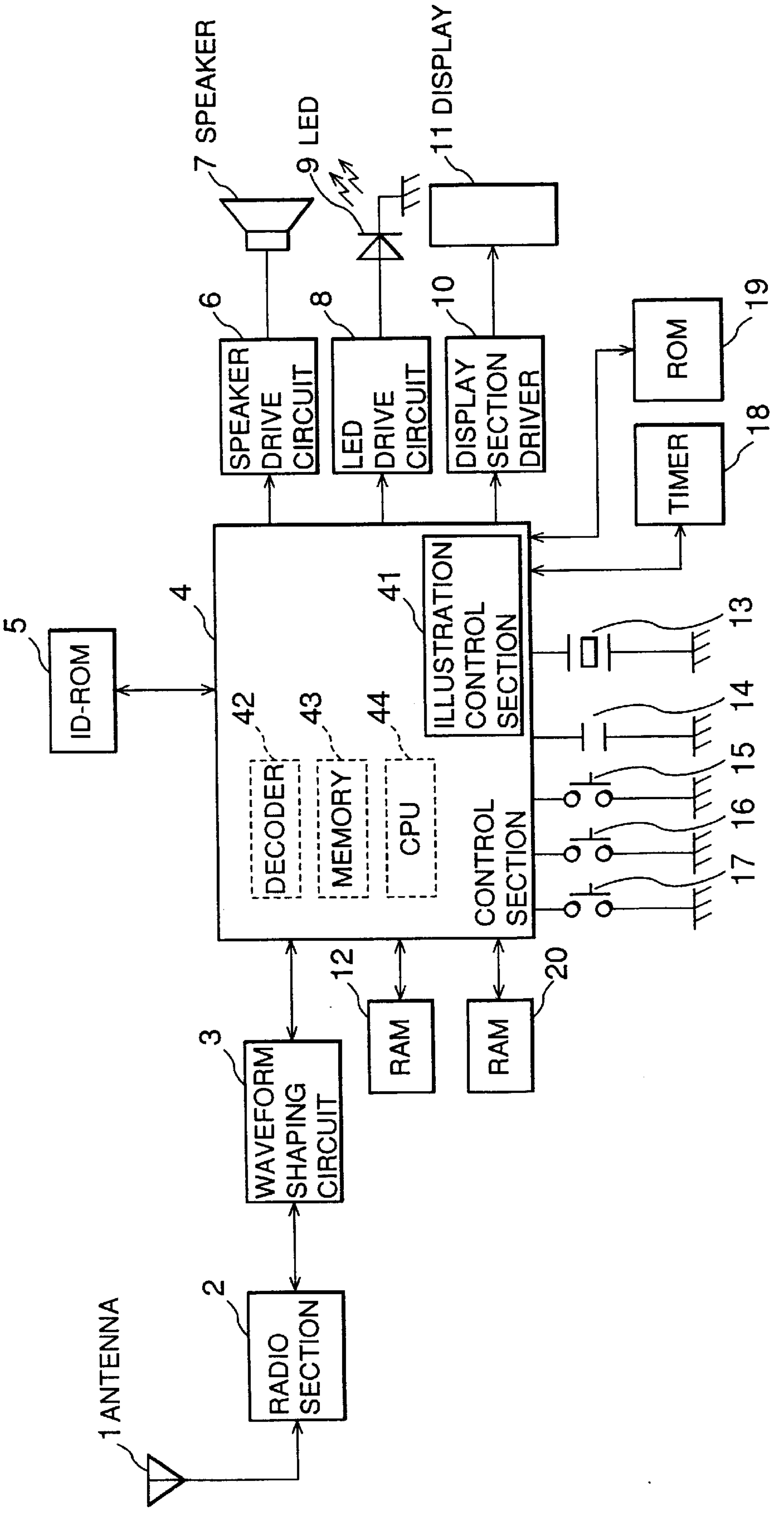
FIG. 1 is a block diagram showing a preferred embodiment of a radio selective call receiver with a display according to the present invention.

FIG. 1 is a block diagram showing a preferred embodiment of a radio selective call receiver with a display according to the present invention.

A radio selective call signal received through an antenna 1 is amplified and demodulated by a radio section 2. The radio section 2 outputs a base band signal. The base band signal is then waveform-shaped by a waveform shaping circuit 3 so that it can be read by a decoder 42 in a control section 4. The control section 4 is provided with a read-only memory 43 for storing a control program and others, a microprocessor (CPU) 44 for controlling respective constituent parts in the receiver by using the control program, and an illustration control section 41, as well as the decoder 42.

The decoder 42 in the control section 4 compares the receiver's own call number previously written in a writable read-only memory (ID-ROM) 5 with a selective call number included in a base band signal fed from the waveform shaping circuit 3. If the call number coincides with the signal, the control section 4 controls a speaker drive circuit 6 and an LED drive circuit 8 so that a sound is generated from a speaker 7 and an light-emitting diode (LED) 9 emits light in order to inform a receiver carrier of an incoming call.

Further, if a receive message signal is included in the base band signal, the control section 4 controls a display section driver 10 to display a received message in a display screen of a display section 11, for example, a liquid crystal display (LCD). The receive message signal is temporarily stored in a memory device (RAM) even after informing an incoming call and, if the carrier of the receiver confirms the received message, the control section 4 reads out the receive message signal from the RAM 12 to again display the received message in the screen of the display section 11.

The radio selective call receiver is further provided with a clock generator 14 for generating a clock for operating the control section 4 and a power supply 14 which uses a battery or the like for the receiver, as well as the above-described constituent parts. The receiver also includes a power supply switch 15 for turning on/off the power supply 14 for feeding power to the control section 4 and others, a display switch 16 for activating confirmative display of various messages such as a received message in the display section 10, and a reset switch 17 for stopping the incoming call informing operation using the speaker 7 and the LED 9.

This radio selective call receiver is characterized by including: a timer 18 for counting a lapsed time T after reception of a message upon being informed of the message reception in accordance with each received message (the above-mentioned receive message signal) by the control section 4; a memory device (RAM) 20 for storing the lapsed time T counted by the timer 18; a ROM (read-only memory) 19 for storing a corresponding illustration in accordance with each predetermined period for the lapsed time T in the form of an illustration code; and an illustration control section 41 built in the control section 4. When the display switch 16 operates to issue a request for confirmatively displaying the received message, the illustration control section 41 reads out from the ROM 19 the illustration code corresponding with the lapsed time T stored in the RAM 20 and displays in the display section 11 the illustration corresponding with the illustration code as well as the received message. It is to be noted that a number of prepared timers 18 equals to that of messages which can be stored in the RAM 12 and each timer 18 counts the lapsed time T after the message reception in accordance with each received message.

Figure 2A:
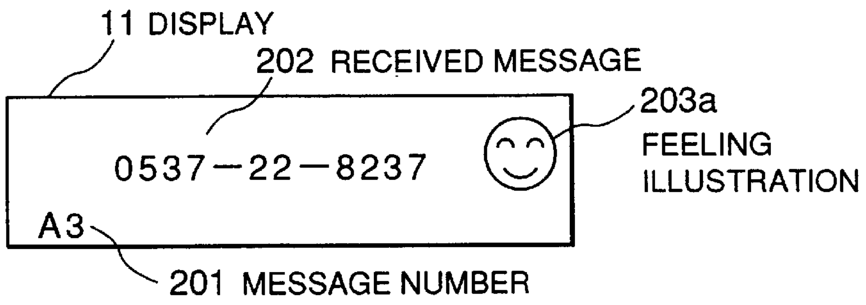
FIGS. 2(*a*) to (*c*) are views showing examples of received messages and illustrations displayed in a display section depicted in FIG. 1.
Figure 2B:
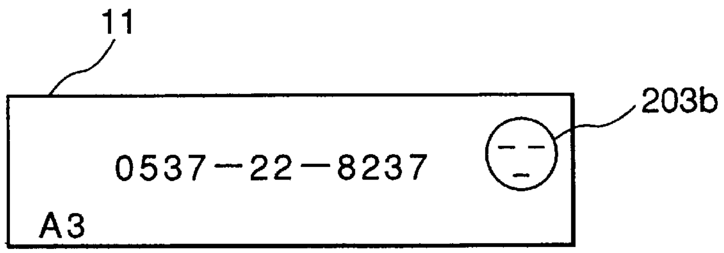
Figure 2C:
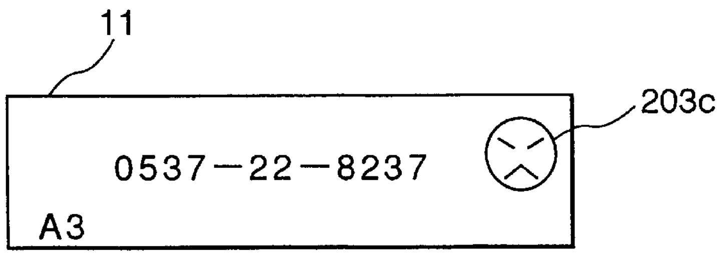

FIG. 2 shows examples of received messages and illustrations displayed in the display section 11 in the embodiment depicted in FIG. 1, in which FIG. 2(*a*) shows a smiling face; FIG. 2(*b*), a straight face; and FIG. 3(*c*), an angry face. That is, time stamp is performed using illustrations expressing feelings.

Referring to FIGS. 1 and 2, each timer 18 classifies the lapsed time T after the message reception into three periods, preferrably, a period less than 1 hour, a period from 1 hour to 6 hours, and a period above 6 hours. In other words, the timers 18 corresponding with respective received messages sequentially send lapsed time signals corresponding with the lapsed times T to the illustration control section 41 when 1 hour or 6 hours pass. The illustration control section 41 newly stores and updates the lapsed time signals in the RAM 20 by using addresses which are also used for storing the received messages in the RAM 12. Of course, the lapsed time may be classified according to different hours.

The ROM 19 previously stores three types of feeling illustration code. A first feeling illustration is a smiling face (see a feeling illustration 203*a* in FIG. 2(*a*)); a second feeling illustration, a straight face (see a feeling illustration 203*b* in FIG. 2(*b*)) which is not the smiling face nor is an angry face; and a third feeling illustration is an angry face (see a feeling illustration 203*c* in FIG. 2(*c*)). When the lapsed time T after the message reception which is less than one hour corresponds to the smiling face, that which is ranged between one to six hours corresponds to the straight face and that which is above six hours corresponds to the angry face, the time required for answering to a caller to this call receiver accords with the illustration expressing a feeling of the caller. Incidentally, it is needless to say that the lapsed time T after reception of the message may be classified in accordance with any other standard.

With the received message being stored in the RAM 12 (memory), if the control section 4 issues a request for confirmatively displaying the received message by operating the display switch 16, the illustration control section 41 reads out a specified received message from the RAM 12 and further reads out the lapsed time signal according with this received message from the RAM 20. The illustration control section 41 then reads out an illustration code according with the lapsed time signal, i.e., the lapsed time T from the ROM 19 in order to display the illustration corresponding with this illustration code as well as the received message which is requested for display in the display section 11.

FIG. 2(*a*) shows such an example as that a received message 202 having a message number 201 represented by the number "A3" is a caller's telephone number "0537-228237." This received message 202 is displayed in a message display area. Further, the message number 201 represents a reception number of a received message 202 and is displayed in a message number display area. In FIG. 2(*a*), since the received message 202 is a message according with the short lapsed time T which is within one hour after message reception, an illustration 203*a* of the smiling face is displayed in an illustration area. Furthermore, in FIG. 2(*b*), the lapsed time is ranged between one to six hours after reception of the received message 202, and hence only display of the illustration is changed from that in FIG. 2(*a*), thereby displaying a feeling illustration 203*b* of the straight face in the display section 11. In FIG. 2(*c*), the message is confirmed when six or more hours have passed after reception of the message 202, which results in display of a feeling illustration 203*c* expressing the angry face.

As described above, since the radio selective call receiver with the display according to the present embodiment displays an illustration, which varies in response to the lapsed time T after reception of the message, together with the received message, it is characterized in that the carrier can immediately recognize the lapsed time after reception of the message without calculation based on the call receiving time and the current time.

FIG. 3 shows an example of the content stored in the RAMs 12 and 20 according to the embodiment illustrated in FIG. 1.

The exemplified RAM 12 can store six receive message signals by using addresses A1 through A6. In the drawing, the receive message signals are shown in the form of received messages displayed by characters in the display section 11 for easy understanding. The lapsed time T after reception of the message signal is stored in the form of a lapsed time signal at each address of the RAM 20 which accords with the RAM 12. However, the lapsed time signal is represented as the lapsed time T in the drawing for easy understanding. This figure shows that the lapsed time T after message reception is long as an address number becomes small and that no received message is stored at addresses A5 and A6.

Figure 4:
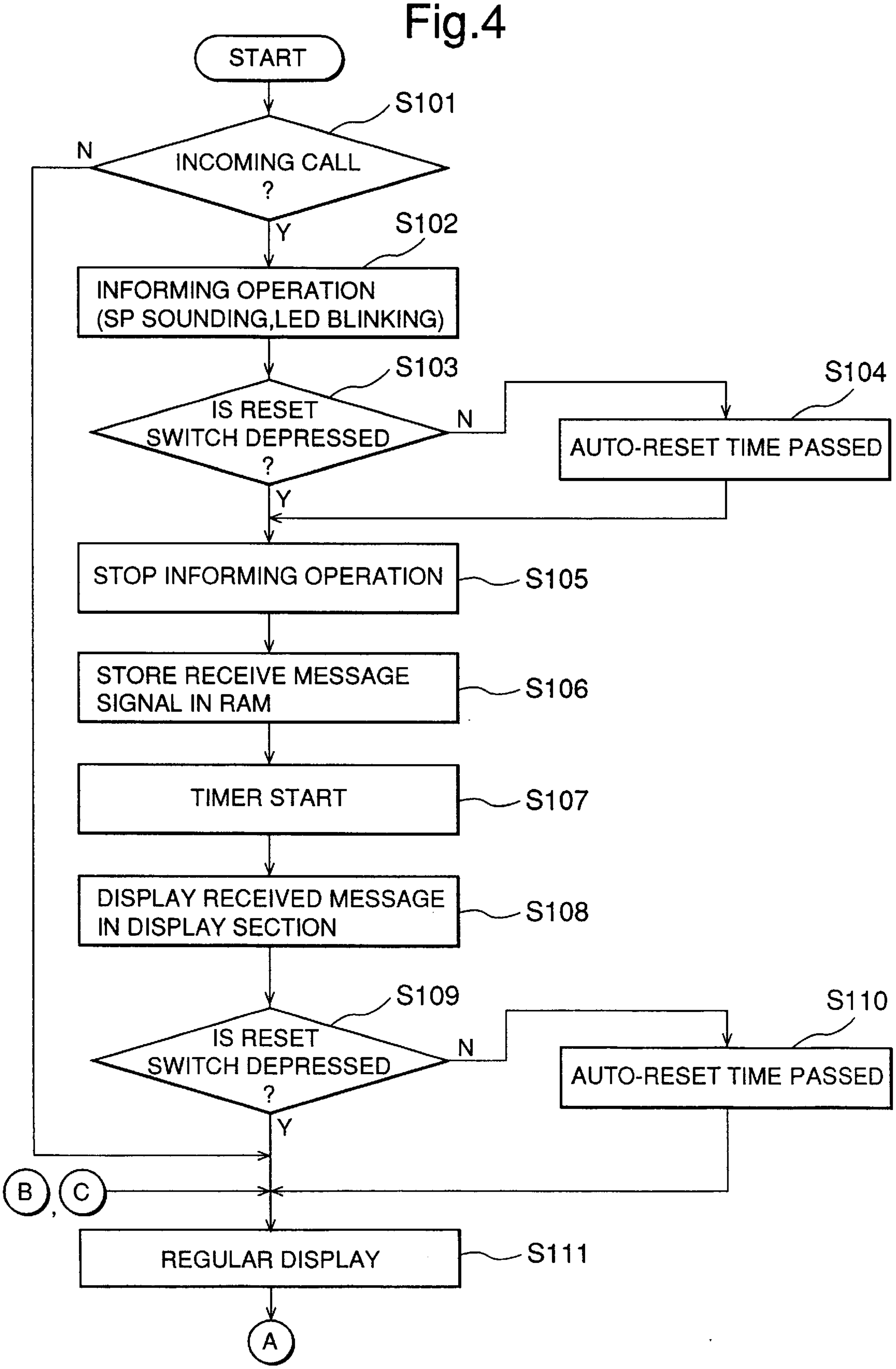
FIG. 4 is a flowchart showing an incoming call informing operation in the radio selective call receiver with the display illustrated in FIG. 1.

FIG. 4 is a flowchart showing an incoming call informing operation in the radio selective call receiver with the display according to the embodiment illustrated in FIG. 1.

When the radio selective call receiver in FIG. 1 receives an incoming call (Y in the step 101), the control section 4 drives the speaker drive circuit 6 and the LED drive circuit 8 so that the a sound is generated from the speaker 6 and light is emitted from the LED 8 in order to perform the informing operation (the step 102). Here, if the carrier pushes the reset switch 17 (Y in the step 103) or if an auto-reset period passes (N in the step 103 and the step 104), the control section 4 stops the informing operation by sound generation and light emission (the step 105) and stores the receive message signal (received message) in the RAM 12 (the step 106) to start the timer 18 according with the received message in order to measure the lapsed time T after reception of the message (the step 107) and display the current received message in the display section 11 (the step 108). When the carrier pushes the reset switch 17 (Y in the step 109) or when the auto-reset time passes (N in the step 109 and the step 110), the display section 11 returns to the regular display operation (the step 111) and the display section 11 again displays the current time and others.

Figure 5:
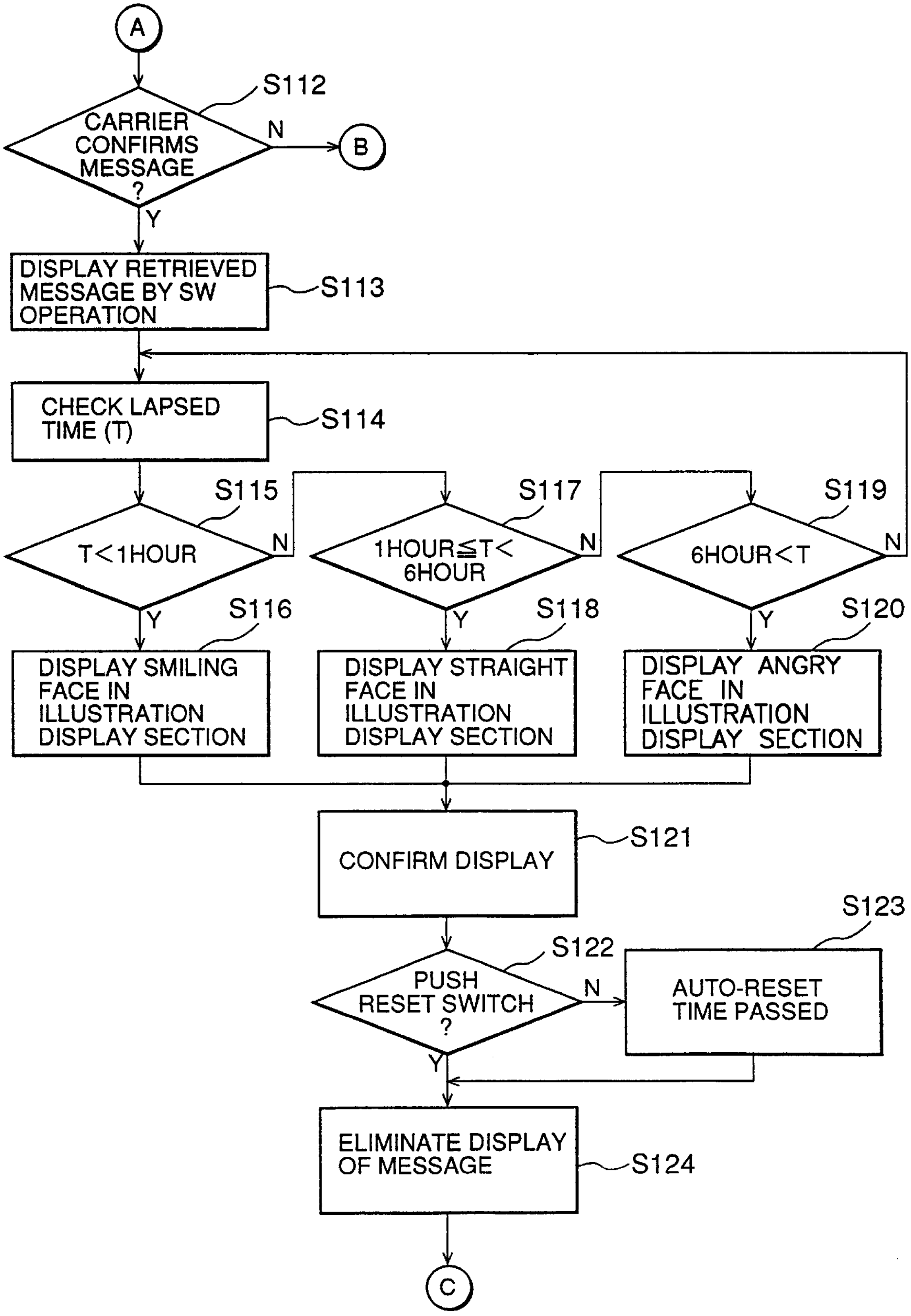
FIG. 5 is a flowchart showing a received message display operation in the radio selective call receiver with the display illustrated in FIG. 1.

FIG. 5 is a flowchart showing the received message display operation in the radio selective call receiver with the display according to the present embodiment.

This received message display operation starts from the regular display mode in the step 111. When the carrier of the call receiver confirms the message which has been already received in accordance with the flowchart in FIG. 4 (Y in the step 112), a series of switch (SW) operations, e.g., pushing the display switch 16, are performed to ensure the control section 4 to retrieve the received message which is to be confirmed and the received message which is thus retrieved and the corresponding message number are displayed in the display section 11 (the step 113). Information of the thus-retrieved received message is sent to the illustration control section 41, and the illustration control section 41 checks the lapsed time T after reception of the retrieved message from the data stored in the RAM 20 (the step 114).

If the lapsed time T is less than one hour (Y in the step 115), the illustration control section 41 reads out the illustration code according with the illustration of the smiling face from the ROM 19 in order to display the feeling illustration of the smiling face in the illustration area in the display section 11 (the step 116). If the lapsed time T is ranged between one to six hours (N in the step 115 and the Y in the step 117), the illustration control section 41 reads out the illustration code according with the illustration of the straight face from the ROM 19 and displays the feeling illustration expressing the straight face in the display section 11 (the step 118). Further, when the lapsed time T is above six hours (N in the step 117 and the Y in the step 119), the illustration control section 41 reads out the illustration code according with the illustration of the angry face from the ROM 19 and displays the feeling illustration expressing the angry face in the display section 11 (the step 120).

With display at the end of the steps 116, 118 and 120, the carrier confirms the received message that he/she is finding and a type of the illustration added to the received message (the step 121). After confirmation of display, when the carrier pushes the reset switch 17 (Y in the step 122) or when the auto-reset time passes (N in the step 122 and the step 123), the control section 4 eliminates display of the received message in the display section 11 (the step 124) and returns the display section 11 to the regular display mode (the step 111 in FIG. 3).

Although figures expressing feelings are used as the illustrations in the above-described embodiment, the present invention is not restricted to this example, and any other illustration or symbol can be similarly used.

As mentioned above, since the radio selective call receiver with the display according to the present invention is provided with the illustration display means which displays an illustration which varies according to a lapsed time after reception of the message as the lapsed time as well as the received message when confirmatively displaying the received message in the displays section, it is possible to immediately recognize the time passed after reception of the message without calculation based on the message receiving time and the current time.

Moreover, if the feeling illustration is employed as the illustration representing the lapsed time after reception of the message, a change in the feeling illustrations can attract more attention from the carrier than display of the current time, and the receiver can thus readily call the carrier's attention to the lapsed time after reception.

While the invention has been described with reference to specific embodiments thereof, it will be appreciated by those skilled in the art that numerous variations, modifications, and embodiments are possible, and accordingly, all such variations, modifications, and embodiments are to be regarded as being with in the spirit and scope of the invention.

What is claimed is:

1. A radio selective call receiver with a time lapsed image display and status, comprising:

receiving means for receiving a radio signal;

control means for displaying a message received by the receiving means;

means for measuring a time lapsed after reception of the message;

comparison means for comparing the lapsed time to at least one threshold time period;

means for selecting one of a plurality of indications in the form of display symbols comprising non-numerical icons based on a result of the comparison means; and indication display means for effecting display of the display symbol associated with the selected indication.

2. A radio selective call receiver according to claim 1, wherein the indication display means changes the indication periodically with an increase in lapsed time.

3. A radio selective call receiver according to claim 1, wherein the indication expresses feelings by: a smiling face in a first period in which the lapsed time is the smallest; a straight face in a second period in which the lapsed time is over the first period but yet to reach a predetermined time; and an angry face when the lapsed time exceeds the second period.

4. A radio selective call receiver according to claim 1, wherein the indication display means comprises:

a timer for counting a lapsed time after reception of the message;

a ROM for previously storing the indications according with the lapsed time for a plurality of periods by using indication codes; and an indication control section which reads out the indication code according with a period of the lapsed time from the ROM and displays the indication according with the indication code together with the received message in the display section.

5. A method for controlling display of a message in a display section comprising the step of when confirmatory displaying a received message in the display section, displaying the received message and a a selected one of a plurality of symbols comprising non-numerical icons, the symbol being selected based on the result of comparing the lapsed time and since reception of the message to at least one threshold time period.

6. A control method according to claim 5, wherein the selected symbol expresses feelings by: a smiling face in a first period in which the lapsed time is the smallest; a straight face in a second period in which the lapsed time is over the first period but yet to reach a predetermined time; and an angry face when the lapsed time exceeds the second period.

7. The receiver of claim 1, wherein the threshold time period is variable.

* * * * *